US007457824B1

(12) United States Patent
Strom et al.

(10) Patent No.: US 7,457,824 B1
(45) Date of Patent: Nov. 25, 2008

(54) METHODS AND APPARATUS FOR MANAGING GROUPS OF RESOURCES

(75) Inventors: Daniel J. Strom, North Andover, MA (US); Alexander Dubrovsky, Westborough, MA (US); James E. Lavallee, Boylston, MA (US); Yifeng Chen, Milford, MA (US)

(73) Assignee: EMC Corporation, Hopkinton, MA (US)

( * ) Notice: Subject to any disclaimer, the term of this patent is extended or adjusted under 35 U.S.C. 154(b) by 568 days.

(21) Appl. No.: 11/023,668

(22) Filed: Dec. 28, 2004

(51) Int. Cl.
*G06F 7/00* (2006.01)
*G06F 17/00* (2006.01)

(52) U.S. Cl. ........................ 707/104.1; 707/2; 709/217; 709/226

(58) Field of Classification Search ....................... None
See application file for complete search history.

(56) References Cited

U.S. PATENT DOCUMENTS

| | | | | |
|---|---|---|---|---|
| 5,636,342 | A * | 6/1997 | Jeffries | 714/48 |
| 6,289,375 | B1 * | 9/2001 | Knight et al. | 709/217 |
| 6,574,655 | B1 * | 6/2003 | Libert et al. | 709/200 |
| 6,996,670 | B2 * | 2/2006 | Delaire et al. | 711/114 |
| 7,003,527 | B1 * | 2/2006 | Lavallee et al. | 707/102 |
| 7,103,665 | B2 * | 9/2006 | Shinohara et al. | 709/226 |
| 7,213,021 | B2 * | 5/2007 | Taguchi et al. | 707/10 |
| 7,222,167 | B2 * | 5/2007 | Asaka et al. | 709/223 |
| 7,233,957 | B1 * | 6/2007 | Sheehy et al. | 707/102 |
| 7,328,260 | B1 * | 2/2008 | Muthiyan et al. | 709/224 |
| 2002/0143942 | A1 * | 10/2002 | Li et al. | 709/225 |
| 2003/0149753 | A1 * | 8/2003 | Lamb | 709/223 |
| 2003/0158966 | A1 * | 8/2003 | Sato | 709/242 |
| 2004/0068561 | A1 * | 4/2004 | Yamamoto et al. | 709/224 |
| 2004/0215904 | A1 * | 10/2004 | Gopisetty et al. | 711/153 |
| 2005/0114438 | A1 * | 5/2005 | Bendich et al. | 709/203 |
| 2005/0172057 | A1 * | 8/2005 | Suzuki et al. | 710/74 |

* cited by examiner

*Primary Examiner*—Tim Vo
*Assistant Examiner*—Jay A Morrison
(74) *Attorney, Agent, or Firm*—Chapin IP Law, LLC

(57) ABSTRACT

An agent in a storage area network communicates with a management entity in the storage area network to discover a group of resources in the storage area network controlled by the management entity. In response to discovering the group of resources, the agent associates member resources (e.g., and their respective names) of the group of resources to a corresponding group identifier to which the member resources belong. The agent reports i) the corresponding group identifier and ii) the member resources of the group of resources controlled by the management entity to a management control center that assigns one of multiple agents in the storage area network to manage the group of resources based on communications with the management entity. After a step of assigning, the management control center can initiate an assigned agent to control the group of resources.

19 Claims, 14 Drawing Sheets

DATA SET 610

| M.E. | RESOURCE | GROUP IDENTIFIER(S) |
|---|---|---|
| 341-1 | R11 | A1 |
| 341-1 | R12 | A1 |
| 341-1 | R13 | A1 |
| 341-2 | R21 | B1 |
| 341-2 | R22 | B1 |
| 341-2 | R23 | B1 |
| 341-1 | RF1 | FA1 |
| 341-1 | RF3 | FA1 |
| 341-2 | RF1 | FB1 |
| 341-2 | RF2 | FB1 |
| 341-2 | RF3 | FB1 |

| M.E. | RESOURCE | GROUP IDENTIFIER(S) |
|---|---|---|
| 341-1 | R11 | A1 |
| 341-1 | R12 | A1 |
| 341-1 | R13 | A1 |
| 341-2 | R21 | B1 |
| 341-2 | R22 | B1 |
| 341-2 | R23 | B1 |
| 341-1 | RF1 | FA1 |
| 341-1 | RF3 | FA1 |
| 341-1 | RF1 | FB1 |
| 341-2 | RF2 | FB1 |
| 341-2 | RF3 | FB1 |

402

404

DATA SET 710

FIG. 7

DATA SET 810

| M.E. | RESOURCE | GROUP IDENTIFIER(S) |
|---|---|---|
| 341-2 | R21 | B1 |
| 341-2 | R22 | B1 |
| 341-2 | R23 | B1 |
| 341-3 | R31 | C1 |
| 341-3 | R32 | C1 |
| 341-3 | R33 | C1 |
| 341-2 | RF1 | FB1 |
| 341-2 | RF2 | FB1 |
| 341-2 | RF3 | FB1 |
| 341-3 | RF1 | FC1 |
| 341-3 | RF2 | FC1 |

METHODS AND APPARATUS FOR MANAGING GROUPS OF RESOURCES

BACKGROUND

Information services and data processing industries in general have rapidly expanded as a result of the need for computer systems to manage and store large amounts of data. As an example, financial service companies such as banks, mutual fund companies and the like now, more than ever before, require access to many hundreds of gigabytes or even terabytes of data and files stored in high capacity data storage systems. Other types of service companies have similar needs for data storage.

Data storage system developers have responded to an increased need for storage by integrating high capacity data storage systems, data communications devices (e.g., switches), and computer systems (e.g., host computers or servers) into networks called "storage networks" or "Storage Area Networks" (SANs). In general, a storage area network is a collection of data storage systems that are networked via a switching fabric to a number of host computer systems operating as servers. The host computers access data stored in the data storage systems on behalf of client computers that request data from the data storage systems. For example, according to conventional applications, upon receiving a storage access request, a respective host computer in the storage area network accesses a large repository of storage through the switching fabric of the storage area network on behalf of the requesting client. Thus, via the host computer (e.g., server), a client has access to the shared storage system through the host computer. In many applications, storage area networks support hi-speed acquisitions of data so that the host servers are able to promptly retrieve and store data from the data storage system.

Conventional storage area network management applications typically include a graphical user interface (GUI) that enables a network manager to graphically manage, control, and configure various types of hardware and software resources associated with a corresponding managed storage area network. For example, one conventional network management storage application generates a graphical user interface utilized by a network manager to graphically select, interface with, and manage local or remote devices and associated software processes associated with the storage area network. Based on use of the graphical user interface in combination with an input device such as a hand operated mouse and corresponding pointer displayed on a viewing screen, a network manager is able to manage hardware and software entities such as file systems, databases, storage devices, peripherals, network data communications devices, etc., associated with the storage area network. Consequently, a network management station and associated management software enables a network administrator or systems manager (a person responsible for managing the storage network) to manage the storage area network and its resources. One purpose of managing storage area network resources is to maintain the storage area network so that the storage area network is properly configured to provide efficient data access to many users.

To manage devices such as switches in a storage area network, a network administrator may arbitrarily assign agents in the storage area network to manage the switches through a common storage area network management device. For example, the network administrator may assign a first agent a duty of managing a first switch based on communications from the first agent to a management device that in turn controls the first switch. Additionally, the network administrator may assign a second agent a duty of managing a second switch device based on communications from the second agent to the same management device that in turn controls the second switch.

SUMMARY

Conventional network management applications that support management of network resources via use of multiple agents in a storage area network typically suffer from a number of deficiencies. For example, assigning multiple agents to manage multiple switches in a storage area network typically results in contention when multiple assigned agents attempt to retrieve information or perform operations with respect to different resources controlled by the same management device in the storage area network. This can occur when retrieval of data for a group of resources managed by the management device is not severable. That is, when prompted by either of multiple assigned agents, the management device may only be able to provide information with respect to a whole group of resources in the group of resources that it controls rather than sending only relevant information to the respective agents about the resources that the respective agents manage. Accordingly, the first agent as discussed above in the background of the present application would receive information about resources managed by the second agent and vice versa in response to, e.g., an inquiry from a management control center about the resources managed by a respective agent.

Arbitrary assignment of agents to manage storage area network resources as discussed above may result in poor system performance and potential timeouts. For example, communication links between agents and a management device may not support the bandwidth required so that the management device can efficiently distribute the redundant set of information about a group of resources to multiple agents. Also, the management device may not have appropriate processing power to quickly disseminate the redundant information to multiple agents. Either of these types of bottlenecks may result in communication timeouts between the agents and the management device and poor performance.

Techniques discussed in this application provide advantages over conventional network management applications. In particular, embodiments of the present application include mechanisms and techniques for assigning a group of resources controlled by a storage area network management entity to a single agent rather than assigning each of multiple agents management responsibilities associated with different resources in the group of resources controlled by a respective management entity. More specifically, according to one configuration discussed herein, a management control center communicates with multiple agents in a storage area network. The agents communicate with management entities that in turn control resources such as switches in the storage area network. Based on this chain of communications, the management control center indirectly controls the resources in the storage area network by initiating the agents to communicate with the management entities and control the resources.

Typically, multiple agents in the storage area network are able to communicate with the same management entity. In such an instance, and according to conventional applications as discussed above, multiple agents may be arbitrarily assigned to manage resources controlled by the same management entity. However, techniques herein enable the management control center to learn which groups of resources in the storage area network are controlled by a particular management entity. Based on the learned groupings of resources, the management control center can assign the agents to manage whole groupings of resources rather than split management responsibilities associated with a group of resources to multiple agents. For example, rather than assign a first agent to manage one resource in a group of related resources (e.g., a group of resources controlled by a respective management entity) and a second agent to manage another resource in the group of related resources, the management control center assigns some or all management responsibilities associated with the group of related resources to either the first agent or the second agent. This technique reduces overhead communications because only one agent communicates with the respective management entity to control the resources rather than two agents.

Accordingly, one general embodiment of the present application is directed to techniques for distinguishing groupings of resources in a storage area network. For example, an agent in a storage area network communicates with a management entity in the storage area network to discover a group of resources in the storage area network controlled by the management entity. In response to discovering a group of resources, the agent associates member resources (e.g., and their respective names) of the group of resources to a corresponding group identifier to which the member resources belong. The agent reports i) the corresponding group identifier and ii) the member resources of the group of resources controlled by the management entity to a management control center that assigns one of multiple agents in the storage area network to manage the group of resources based on communications with the management entity.

Another general embodiment of the invention is directed to a technique of assigning management responsibilities associated with resources in a storage area network to multiple agents, the multiple agents being in communication with management entities that in turn control the resources in the storage area network. For example, a management control center generates an inquiry to learn of resources controlled by the management entities of the storage area network. In response to the inquiry, the management control center receives resource identifiers and respective group identifiers for at least a portion of the multiple resources in the storage area network. The resource identifiers identify respective resources of the storage area network. The group identifiers identify corresponding groups of resources to which the identified resources belong. Typically, a group of resources as identified by a common group identifier is controlled by a respective management entity of the storage area network. The management control center assigns a particular agent in the storage area network to execute management responsibilities (based on the assigned agents communicating with the respective management entity) associated with a group of resources having a common associated group identifier.

Techniques of the present application are well suited for use in systems in which a management control center discovers groups of resources managed by management entities in a storage area network and the management control center assigns agents distributed in the storage area network duties of communicating with the management entities that in turn control the groups of resources. However, it should be noted that embodiments of the present application are not limited to use in such applications.

Other embodiments of the present application include a computerized device (e.g., a host computer, workstation, etc.) configured to support the aforementioned method operations disclosed herein as embodiments of the present application to assign management capabilities among multiple agents in a storage area network. In such embodiments, the computerized device such as a management control center includes a memory system, a processor (e.g., a processing device), a display, and an interconnect. The interconnect supports communications among the display, the processor, and the memory system. The memory system is encoded with an application that, when executed on the processor, produces a process that supports offloading execution of management operations to agents that operate on behalf of a management control center.

Yet other embodiments of the present application disclosed herein include software programs to perform the method embodiment and operations summarized above and disclosed in detail below under the heading Detailed Description. More particularly, a computer program product (e.g., a computer-readable medium) including computer program logic encoded thereon may be executed on a computerized device to support discovery of groups of resources and assignment of management responsibilities as explained herein. The computer program logic, when executed on at least one processor with a computing system, causes the processor to perform the operations (e.g., the methods) indicated herein as embodiments of the present application. Such arrangements of the present application are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the present application.

One more particular embodiment of the present application is directed to a computer program product that includes a computer readable medium having instructions stored thereon for supporting management of network resources. The instructions, when carried out by a processor of a respective computer device, cause the processor to perform the steps of: i) generating an inquiry to learn of resources controlled by management entities of a storage area network; ii) in response to the inquiry, receiving resource identifiers and respective group identifiers for at least a portion of the multiple resources in the storage area network, the resource identifiers identifying respective resources of the storage area network, the group identifiers identifying corresponding groups of resources to which the identified resources belong, the groups of resources as identified by common group identifiers being controlled by respective management entities of the storage area network; and iii) assigning a particular agent in the storage area network to execute management responsibilities associated with a group of resources having a common associated group identifier. Other embodiments of the present application include software programs to perform any of the method embodiment steps and operations summarized above and disclosed in detail below.

It should be understood that the system of the present application can be embodied as a software program or as a software program operating in conjunction with corresponding hardware. Example embodiments of the present application may be implemented in conjunction with EMC's Control Center (ECC) software application that provides graphical management functionality for storage area network resources and in computerized devices that operate the Control Center (ECC) software. Control Center software is manufactured by EMC Corporation of Hopkinton, Mass., USA.

BRIEF DESCRIPTION OF THE DRAWINGS

The foregoing and other objects, features, and advantages of the present application will be apparent from the following more particular description of preferred embodiments of the present application, as illustrated in the accompanying drawings in which like reference characters refer to the same parts throughout the different views. The drawings are not necessarily to scale, with emphasis instead being placed upon illustrating the embodiments, principles and concepts.

FIG. 6 is a diagram illustrating resources controlled by a respective management entity and corresponding group identifiers indicating to which group a corresponding resource belongs.

FIG. 7 is a diagram illustrating resources controlled by a respective management entity and corresponding group identifiers indicating to which group a corresponding resource belongs.

FIG. 8 is a diagram illustrating resources controlled by a respective management entity and corresponding group identifiers indicating to which group a corresponding resource belongs.

DETAILED DESCRIPTION

According to one implementation of the present application, an agent in a storage area network communicates with a management entity in the storage area network to discover a group of storage area network resources controlled by the management entity. In response to discovering the group of resources, the agent associates member resources (e.g., and their respective names) of the group of resources to a corresponding group identifier to which the member resources belong. For example, the agent generates a list of resources (e.g., managed objects) and a corresponding group identifier that identifies a respective group to which the resources belong. The agent reports i) the corresponding group identifier and ii) the member resources of the group of resources controlled by the management entity to a management control center that assigns one of multiple agents in the storage area network to manage the group of resources based on communications with the management entity. After a step of assigning, the management control center can initiate an assigned agent to communicate with a respective management entity to control the group of resources.

This technique of distinguishing which resources form a particular group and assigning an agent to manage a respective group of storage area network resources (rather than splitting management of the group of resources among multiple agents) alleviates a management control center from having to coordinate direct communications with and control many different types of vendor devices in the storage area network. Instead of relying on direct communications, the management control center indirectly controls a group of resources through a respectively assigned agent. As an example, in response to receiving a control command from a user at the management control center, the management control center transmits user-generated requests or commands to the respectively assigned agents that, in turn, communicate with respective management entities to control resources of the storage area network on behalf of the management control center.

As discussed, one reason for assigning management functions associated with a group of resources associated with a respective management entity to a single agent rather than splitting management functions to multiple agents for a group of resources is to reduce overhead such as network traffic, eliminate contention, and increase system performance, etc. That is, only the single assigned agent managing the group of resources needs to communicate with the respective management entity about the group of resources rather than two otherwise assigned agents communicating with the respective management entity about the same group of resources.

Figure 1:
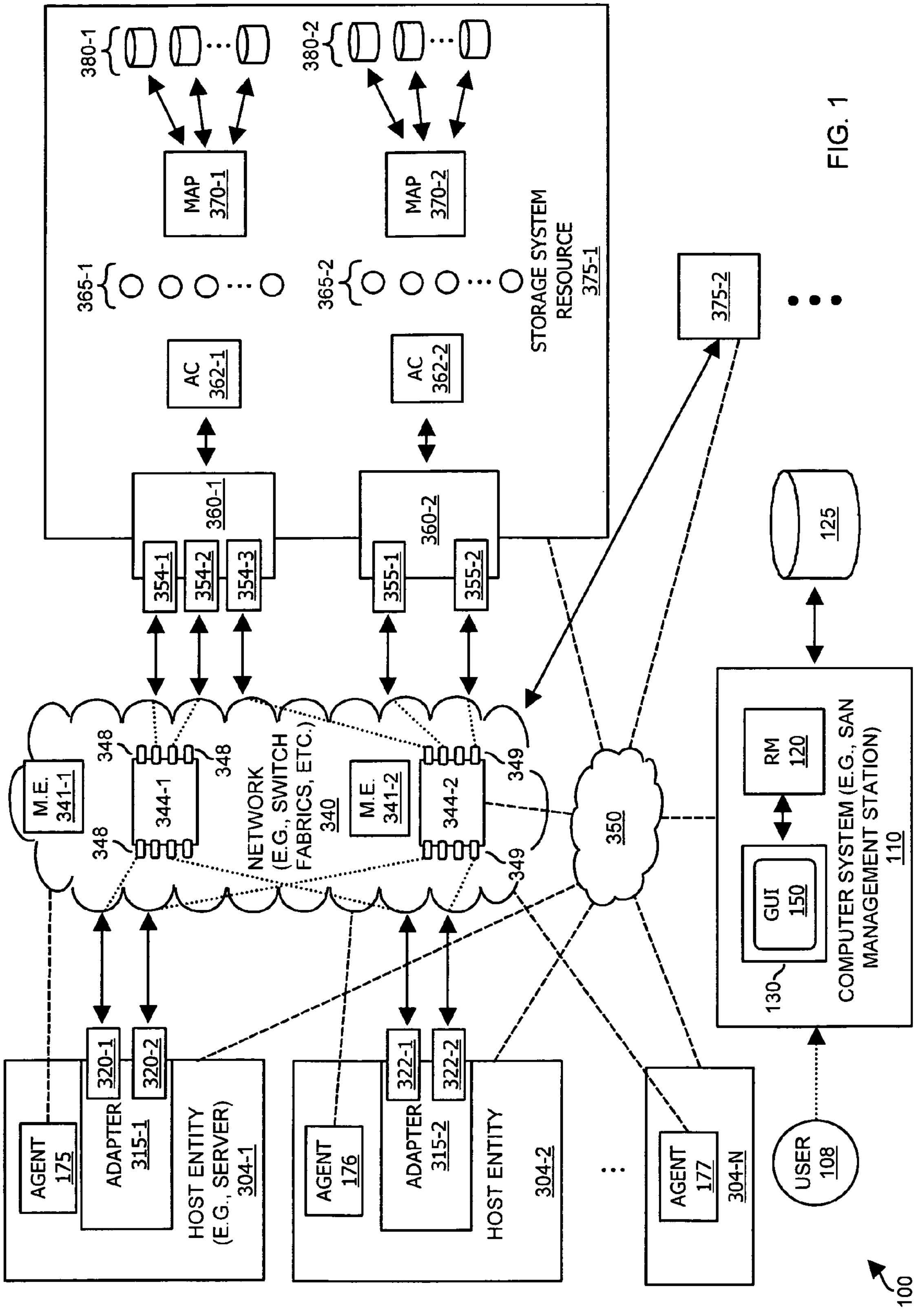
FIG. 1 is a block diagram of a storage area network and a management station configured to support assignment of management responsibilities to multiple agents in a storage area network environment.

FIG. 1 is a block diagram illustrating connectivity of network resources (e.g., host resources, network or fabric resources, and storage resources) in a storage area network 100 according to an embodiment of the present application. As shown, storage area network 100 includes host entity 304-1, host entity 304-2, . . . , (collectively, host entities 304), network 340 (e.g., a high speed fiber-based switch fabric), network 350 (e.g., LAN, WAN, Internet, intranet, fiber-based fabric, etc.), storage system resource 375-1, storage system resource 375-2, . . . (collectively, storage system resources 375), computer system 110, and repository 125 (e.g., database, storage, etc.).

Network 340 includes switch device 344-1, switch device 344-2 which themselves have corresponding switch ports 348 and 349. Network 340 also includes me 341-1, me 342-2, . . . (collectively, management entities 341) that control resources in storage area network environment 100 and more specifically groups of resources in network 340. For example, me 341-1 can be configured to control groups of switches in switch device 344-1, me 341-2 can be configured to control groups of switches in switch device 344-2, etc. This will be discussed in greater detail later in this specification.

Host entity 304-1 includes adapter 315-1 and corresponding port 320-1 and port 320-2 to communicate over network 340. Host entity 304-2 includes adapter 315-2 and corresponding port 322-1 and port 322-2 to communicate over network 340. Storage system resources 375-1 includes respective adapters 360-1 and 360-2, corresponding parts 354-1, 354-2, 354-3, 355-1 and 355-2, access controllers 362-1 and 362-2, storage devices 365-1 and 365-2, maps 370-1 and 370-2, as well as physical storage devices 380-1 and 380-2. Host entity 304-1 executes agent 175; host entity 304-2 executes agent 176; and host entity 304-N executes agent 177. Storage area network 100 can include any number of agents, each of which may operate on any computerized device in the storage area network environment 100. For example, agents can reside in respective devices in network 340, network 350, etc.

In general, and as will be more particularly discussed, computer system 110 (e.g., management control system) learns of groupings of resources in storage area network environment 100 and assigns an agent in storage area network environment 100 duties of supporting exclusive sets of management functions associated with the group of resources. For example, the agents communicate with me 341 that in turn control groups of resources (e.g., switches 344) in network 340. Based on the assignments, agents 175, 176, and 177 act on behalf of computer system 110 to control, e.g., switch devices 344. Proper configuration and control of switches 344 ensures that host entities 304 may efficiently access data from storage system resources 375 on behalf of clients.

Agents can be distributed throughout storage area network environment 100 as shown. In one application, agents 175, 176, 177 run on respective host entities 304 that are not dedicated to serving data from storage area network environment 100 to corresponding clients. In other words, agents optionally run on host resources (e.g., host entities 304) that are at least partially dedicated to executing agents, but not serving clients. Agents may also run on host entities that do serve data retrieved from storage system resources 375 to respective clients.

For illustrative purposes, computer system 110 (e.g., a management control center) is configured, in this example, as a storage area network management station operated by a user 108 such as a network manager responsible for managing resources in the storage area network 100. For example, computer system 110 executes a resource manager application 120 (e.g., a software graphical user interface application) that generates and displays information in accordance with embodiments of the present application as will be explained herein. The resource manager 120 may be any type of network management software application that executes, performs, or otherwise operates within computer 110 such as a computerized management station.

The management station computer system 110 (e.g., a computer device) includes a corresponding display 130 (e.g., a monitor or other visual display device) that resource manager 120 controls to display a graphical user interface 150. In general, graphical user interface 150 presented by a software application (e.g., resource manager 120) running on computer 110 enables user 108 to initiate execution of commands to associated devices such as switches 344 in storage area network environment 100. For example, a user 108 may provide input commands (e.g., selections by clicking on a mouse) to i) control information (e.g., tables, pop-up screens, etc.) displayed on display 130 and ii) request an agent 175 (or other agents as is generally the case throughout this document) to perform a management function (e.g., configuration of switches 344).

In one application, resource manager 120 initiates discovery or rediscovery of management capabilities and groupings of resources associated with resources in storage area network environment 100 without being prompted by a user 108. For example, resource manager 120 periodically or occasionally executes a discovery/rediscovery as a regular course of business to learn of management capabilities associated with devices in the storage area network environment 100. In response to learning new management capabilities, the computer system 110 may assign/reassign the agents 175, 176, and 177 different management functions or duties.

Computer system 110 and, more particularly, resource manager 120 stores learned attributes associated with storage area network environment 100 in repository 125. Based on management capabilities reported by agents 175, 176, and 177 to computer system 110, resource manager 120 notifies (e.g., via a display screen 130 of selectable options in graphical user interface 150) user 108 of management functions that can be performed on resources (e.g., switch devices) in the storage area network environment 100.

Note again that storage area network environment 100 enables host entities 304 (e.g., servers, etc.) to access data in storage system resources 375 on behalf of clients coupled to or through the host entities 304. However, as discussed, certain host entities 304 are optionally dedicated to running agent applications rather than server applications for serving data to clients.

The following discussion illustrates how certain host entities 304 in storage area network environment 100 serve data to clients. For example, host entity 304-1 couples to network 340 via adapter 315-1 and corresponding ports 320. Ports 320 couple to respective ports 348 and 349 on switch devices 344. In turn, ports 348 and 349 of switch devices 344 couple to ports 354 and 355 of corresponding storage system resources 375. Thus, switch devices 344 and corresponding ports 348 and 349 form at least part of a data path (e.g., a zone) between host entities 304 and corresponding storage system resources 375.

Storage system resources 375-1 include access controllers 362 to facilitate access to corresponding storage devices 365 (e.g., logical storage space). Storage devices 365 are configured as logical portions of one or more physical storage devices 380 (e.g., arrays of storage disks). Maps 370 provide a mapping of storage devices 365 (e.g., logical volumes) to corresponding physical storage devices 380 (e.g., storage disks).

Typically, selected host entities 304 are limited to accessing certain storage devices 365 in storage system resource 375-1 based at least in part on configuration settings of switch devices 344 of network 340. For example, in one embodiment, switch ports 348 and 349 of switches 344 are assigned to create a particular zone in network 300. In general, a zone defines a group of resources in the network providing a logical path i) through a switch resource 302 and ii) between a host resource 301 and a storage array resource 303. Thus, in some respects, a zone defines a logical data flow path in the storage area network environment 100.

As discussed, computer system 110 assigns agents 175, 176, and 177 to manage different groupings of resources to more effectively support configuration of and communication within storage area network environment 100. Based on the assignments, agents 175, 176, and 177 in storage area network environment 100 enable user 108 to configure the storage area network environment 100 so that host entities can more efficiently access data on behalf of corresponding clients. That is, assigning agents to manage groups of resources controlled by management entities 341 enable the computer system 110 and corresponding user 108 to more efficiently manage resources (e.g., groups of resources) in storage area network environment 100.

Figure 2:
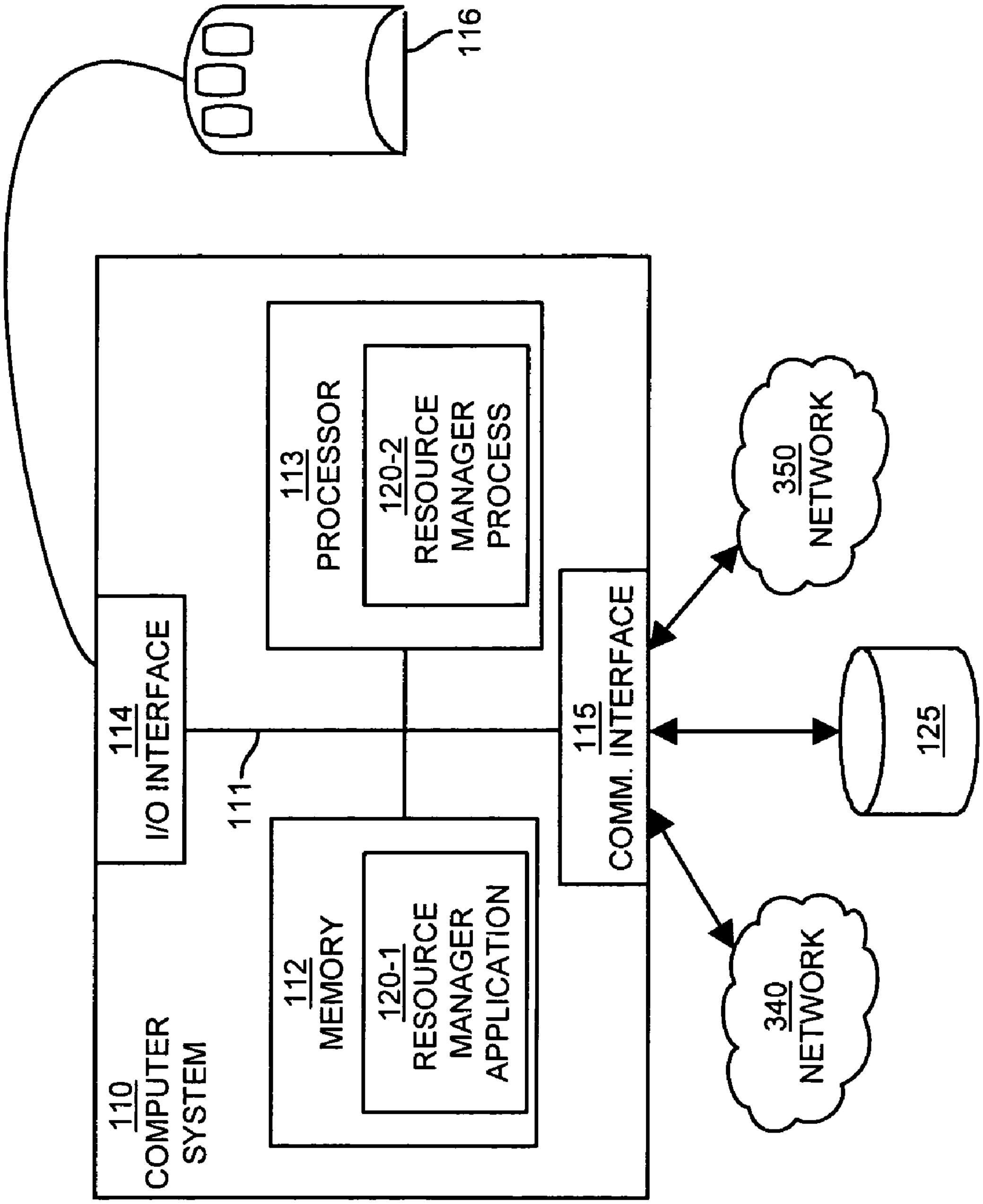
FIG. 2 is a block diagram of a processing device suitable for executing a resource manager process according to an embodiment of the present application.

FIG. 2 is a block diagram illustrating an example architecture of a computer system 110 for executing a resource manager application 120 according to embodiments of the present application. Computer system 110 may be a computerized device such as a personal computer, workstation, portable computing device, console, network terminal, processing device, router, server, etc. As shown, computer system 110 of the present example includes an interconnect 111 that couples a memory system 112, a processor 113, I/O interface 114, display 130, and a communications interface 115. Peripheral devices 116 (e.g., one or more optional user controlled devices such as a keyboard, mouse, display screens, etc.) couple to processor 113 through I/O interface 114.

Communications interface 115 of computer system 110 enables computer system 110 to communicate over network 340 and network 350 with other devices (i.e., resources) associated with storage area network environment 100 as well as access repository 125.

As shown, memory system 112 is encoded with a resource manager application 120-1 supporting assignment of management capabilities associated with a network device in storage area network environment 100. Resource manager application 120-1 may be embodied as software code such as data and/or logic instructions (e.g., code stored in the memory or on another computer readable medium such as a disk) that supports processing functionality according to different embodiments described herein. During operation, processor 113 accesses memory system 112 via the interconnect 111 in order to launch, run, execute, interpret or otherwise perform the logic instructions of the resource manager application 120-1. Execution of resource manager application 120-1 produces processing functionality in resource manager process 120-2. In other words, the resource manager process 120-2 represents one or more portions of the resource manager application 120-1 (or the entire application) performing within or upon the processor 113 in the computer system 110.

It should be noted that the resource manager 120 (in FIG. 1) executed in computer system 110 can be represented by either one or both of the resource manager application 120-1 and/or the resource manager process 120-2. For purposes of the discussion of the operation of embodiments of the present application, general reference will be made to the resource manager 120 as performing or supporting the various steps and functional operations to carry out the features of embodiments of the present application.

It should be noted that, in addition to the resource manager process 120-2, embodiments of the present application also include the resource manager application 120-1 itself (i.e., the un-executed or non-performing logic instructions and/or data). The resource manager application 120-1 may be stored on a computer readable medium such as a floppy disk, hard disk or in an optical medium. The resource manager application 120-1 may also be stored in a memory type system such as in firmware, read only memory (ROM), or, as in this example, as executable code within the memory system 112 (e.g., within Random Access Memory or RAM). In addition to these embodiments, it should also be noted that other embodiments of the present application include the execution of resource manager application 120-1 in processor 113 as the resource manager process 120-2. Thus, those skilled in the art will understand that the computer system 110 may include other processes and/or software and hardware components, such as an operating system that controls allocation and use of hardware resources.

Figure 3:
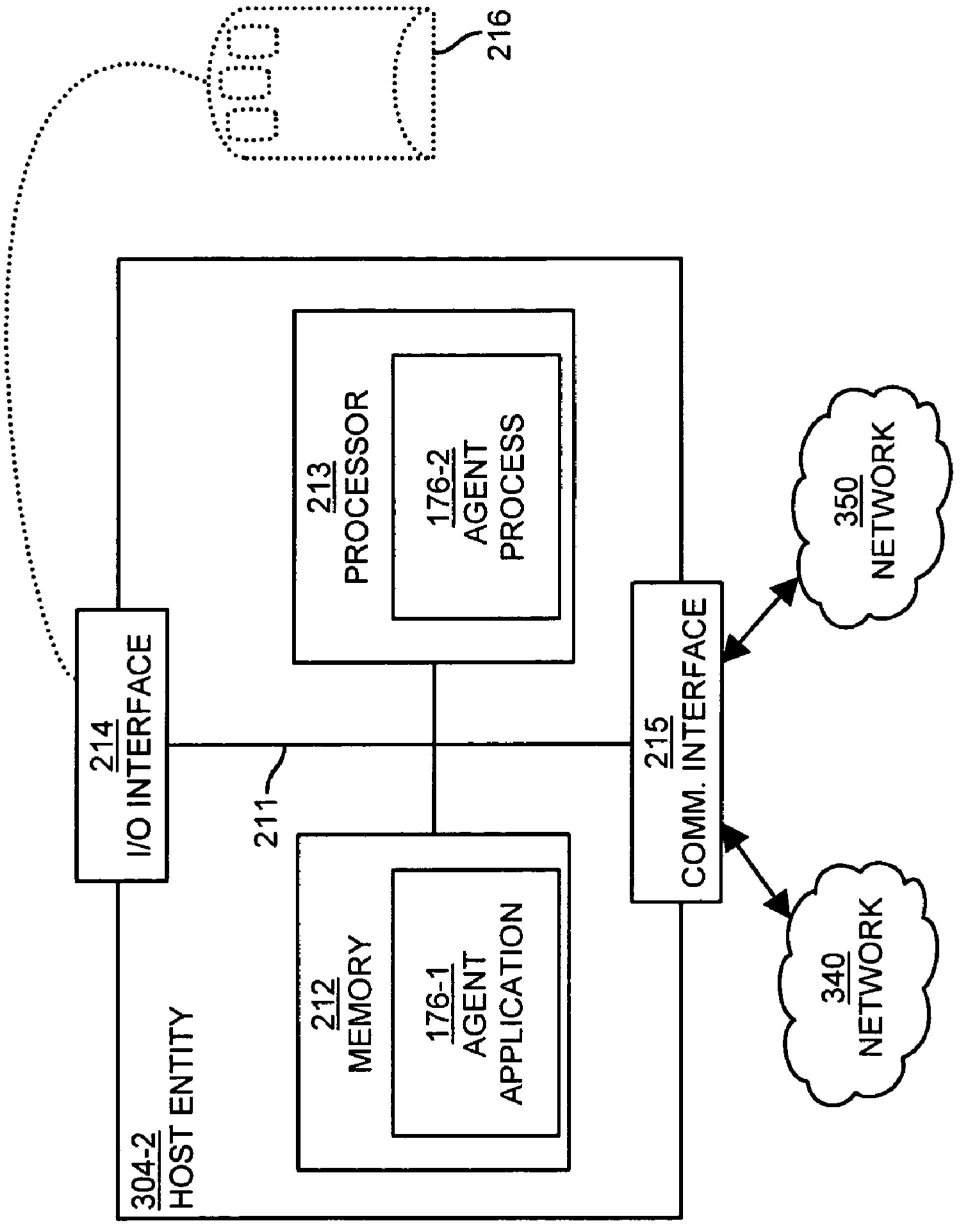
FIG. 3 is a block diagram of a processing device suitable for executing an agent process according to an embodiment of the present application.

Similar to the configuration and details discussed for above for FIG. 2, FIG. 3 is a block diagram illustrating an example architecture of a host entity 304-2 for executing an agent application 176 according to embodiments of the present application. Host entity 304-2 also may be computerized device such as a personal computer, workstation, portable computing device, console, network terminal, processing station, server, etc. As shown, host entity 304-2 of the present example includes an interconnect 211 that couples a memory system 212, a processor 213, I/O interface 214, and a communications interface 215. Peripheral devices 216 (e.g., one or more optional user controlled devices such as a keyboard, mouse, display screens, etc.) couple to processor 213 through I/O interface 214.

Figure 4:
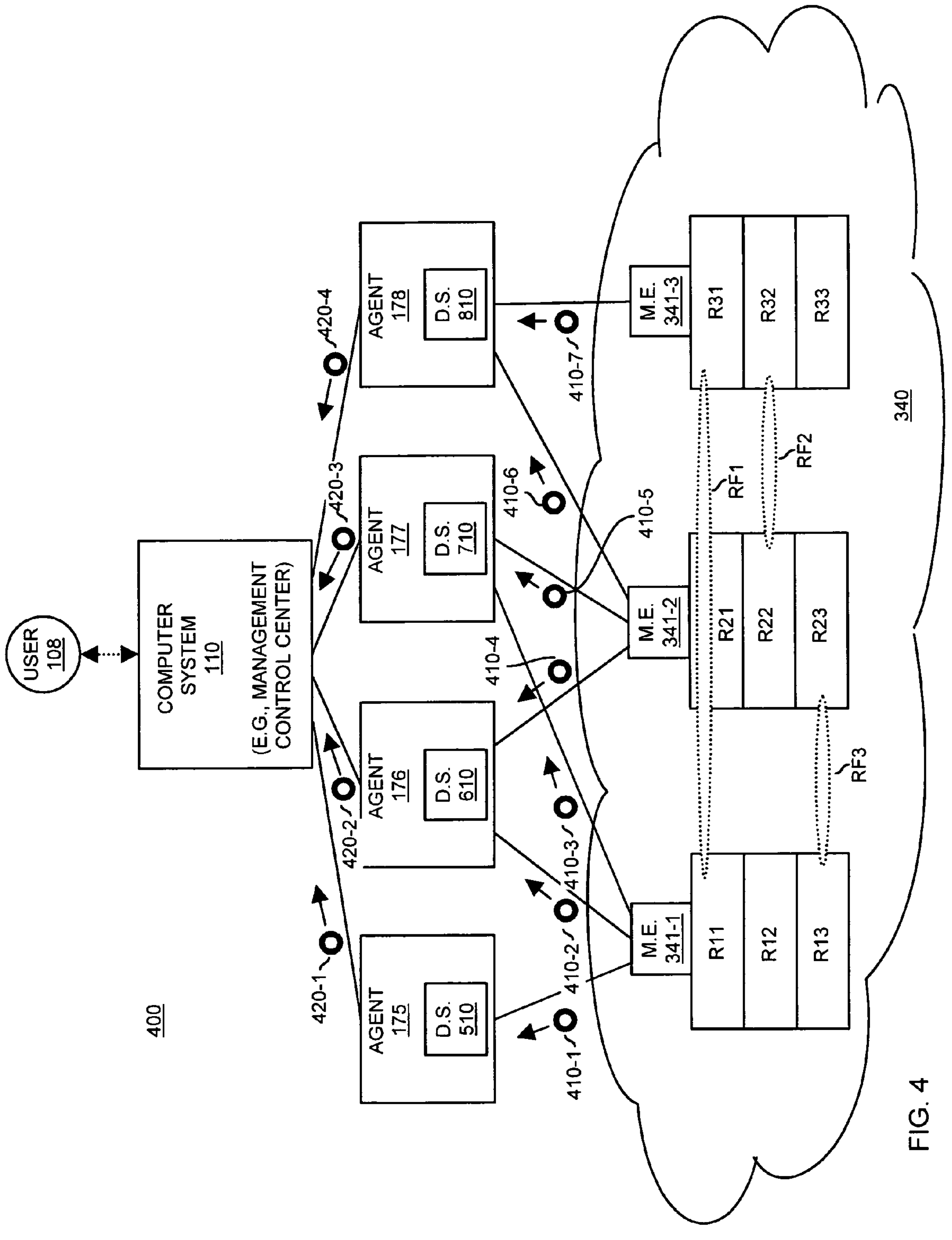
FIG. 4 is a diagram illustrating how one or more agents in a storage area network discovers attributes of storage area network devices and forwards learned attributes to a central computer.

FIG. 4 is a diagram illustrating a technique of supporting discovery of groupings of resources (e.g., managed objects) associated with management entities 341 in storage area network environment 100. As shown, management control system 400 includes computer system 110, agents 175, 176, 177, and 178, which maintain respective data sets 510, 610, 710 and 810. Network 340 includes management entity 341-1, management entity 341-2, management entity 341-3, and network 340. Management entity 341-1 can potentially manage respective resources R11, R12, R13, RF1, and RF3. Management entity 341-2 can potentially manage respective resources R21, R22, R23, RF1, RF2, and RF3. Management entity 341-3 can potentially manage respective resources R31, R32, R33, RF1, and RF2.

In general, agents 175, 176, 177, and 178 discover groupings of resources by communicating with management entities 341. Based on the discovered groupings of resources, respective agents 175, 176, 177, and 178 generate respective data sets 510, 610, 710, and 810 reflecting the groupings of resources. In one embodiment, computer system 110 (e.g., management control center) communicates with agents 175, 176, 177, and 178 to identify i) which groups of resources are managed by respective management entities 341, and ii) which agents in storage area network environment 100 can communicate with which respective management entities 341. In another embodiment, the computer system 110 learns of groupings of resources and assigns the agents to manage the groupings of resources without knowing which respective management entities are associated with the groups of resources. In this latter case, the agents keep track of which management entities are associated with respective groups of resources. Because of such tracking, the agents already know with which management entities to communicate when managing the groups of resources on behalf of the computer system 110 and therefore need not be notified by the computer system 110. Agents include respective interfaces (e.g., management application programming interfaces) capable of communicating with management entities 341 based on, for example, communication protocols such as i) SNMP (Simple Network Management Protocol), ii) FAL (Fabric Access Layer), iii) SMI (Storage Management Interface), and/or iv) SWAPI (Switch Application Programming Interface), etc. As mentioned, communications via such protocols enable discovery and management of device attributes (e.g., management capabilities) such as configuration, name of ports, connectivity paths, zone information, vendor type, etc associated with resources in storage area network environment 100.

In one application, computer 110 forwards one or more management addresses (e.g., network addresses associated with management entities 341 in the storage area network environment 100) to agents, which operate on behalf of the management control center (i.e., computer 110) and utilize the management address (or addresses) to communicate with and query corresponding management entities 341 about its corresponding management capabilities (e.g., ability to manage respective resources). After assignment of management responsibilities associated with a group of resources, assigned agents utilize the management addresses to communicate with management entities 341 that in turn control the resources. Note that a grouping of resources can include as few as a single resource. For such a case, there will be only a single resource associated with a group identifier.

Prior to assignment of managing groups of resources such as during a discovery phase, via respective communications 410-1, 410-2, and 410-3 (collectively, communications 410), management entity 341-1 informs respective agents 175, 176, and 177 that management entity 341-1 controls resources R11, R12, R13 (e.g., switch resources) and potentially can control resources RF1, and RF3 (e.g., fabric resources). Via respective communications 410-4, 410-5, and 410-6, management entity 341-2 informs respective agents 176, 177, and 178 that management entity 341-2 controls resources R21, R22, R23 (e.g., switch resources) and potentially can control resources RF1, RF2, and RF3 (e.g., fabric resources). Via respective communications 410-7, management entity 341-3 informs respective agent 178 that management entity 341-3 controls resources R31, R32, R33 (e.g., switch resources) and potentially can control resources RF1, RF2, and RF3 (e.g., fabric resources).

Note that management entities 341 can be co-located with respect to a grouping of resources. As an example, management entity 341-1 and a respective group of resources R11, R12, and R13 such as switch devices may be located in a common electronic equipment housing. Alternatively, management entity 341-1 may communicate over a link in network 340 to control the group of resources including R11, R12, and R13.

In response to receiving communications 410, agents 175, 176, 177, and 178 generate respective data sets 510, 610, 710, and 810. FIGS. 5-8 are diagrams of respective data sets 510, 610, 710, and 810 illustrating resources controlled by a respective management entity 341 as well as corresponding group identifiers 404 associated with resources indicating to which group a corresponding identified resource 402 belongs.

Figure 5:
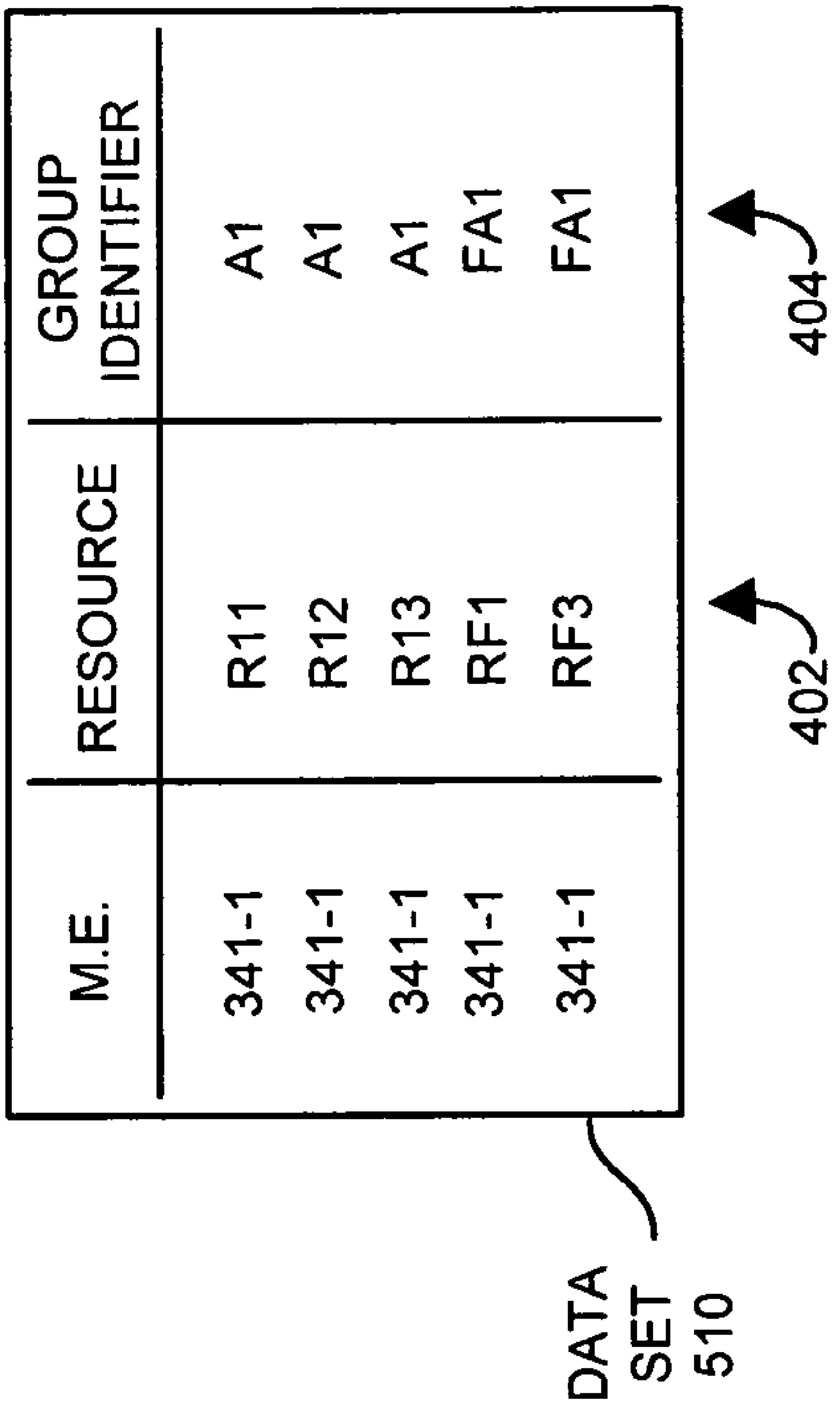
FIG. 5 is a diagram illustrating resources controlled by a respective management entity and corresponding group identifiers indicating to which group a corresponding resource belongs.

More specifically, as shown in FIG. 5, data set 510 (e.g., resource list) generated by agent 175 includes a column of resource identifiers 402 and corresponding group identifiers 404 indicating to which group each identified resource in the data set 510 belongs. For example, data set 510 indicates that resources R11, R12, and R13 all have a common group identifier 404 (i.e., A1) meaning that they belong to the same group of resources. Data set 510 also indicates that resources RF1 and RF3 all have a common group identifier 404 (i.e., FA1) meaning that they also belong to the same group of resources, which are potentially controlled by management entity 341-1. In this case, agent 175 communicates with only a single management entity and therefore knows that both groups of resources as identified by A1 and A2 are potentially controlled by management entity 341-1.

In one application, data set 510 includes a column identifying a respective management entity that manages a respective group of resources identified by a common group identifier. However, this information may not be necessary because a group identifier itself can incorporate information regarding which management entity 341 in storage area network environment 100 manages the group of resources. In other embodiments, the group identifier is an arbitrary text string or binding key associated with a group of resources.

Note also that in one application, different agents in storage area network environment 100 generate the same group identifier 404 for a given group of resources. For example, both agent 175 and agent 175 communicate with management entity 341-1 to learn of which groups of resources management entity 341-1 controls. As shown in data set 510 and data set 610, group of resources R11, R12, and R13 have an associated group identifier 404 of A1. Both data set 510 and data set 610 include entries for this group of resources. In one application, the agent 175 and 176 generate the group identifiers based on identifier (such as a World Wide Name) of the management entity 341 that manages a respective group of resources. In another application, the agents 175 and 176 generate an arbitrary text string text, numeric string, or combination text/numeric string to be a group identifier associated with a respective group of resources.

As shown in FIG. 6, data set 610 (e.g., a resource list) generated by agent 176 includes a column of resource identifiers 402 and corresponding group identifiers 404 indicating to which group each identified resource in the data set 610 belongs. For example, data set 610 indicates that resources R11, R12, and R13 all have a common group identifier 404 (i.e., A1) indicating that these resources belong to a common group of resources controlled by management entity 341-1. Data set 610 also indicates that resources R21, R22, and R23 all have a common group identifier 404 (i.e., B1) indicating that these resources belong to a common group of resources controlled by management entity 341-2. Data set 610 also indicates that resources RF1 and RF2 have a common group identifier 404 (i.e., FA1) indicating that these resources also belong to the same group of fabric type of resources and are potentially controlled by management entity 341-1. Data set 610 also indicates that resources RF1, RF2, and RF3 have a common group identifier 404 (i.e., FB1) indicating that these resources also belong to the same group of fabric type of resources and are potentially controlled by management entity 341-2.

Note that a single resource can include multiple associated group identifier values or binding keys and therefore belong to multiple groups of resources. For example, resource RF1 and RF2 both have associated group identifiers FA1 and FB1 indicating that such resources belong to respective groups controlled by management entity 341-1 and management entity 341-2.

For data set 610, agent 176 communicates with multiple management entities 341 in storage area network environment 100 and distinguishes which management entity 341 controls a group or groups of resources based on contents (e.g., a letter) in the group identifier. For example, a letter, text string, number, unique value in the group identifier 404 can identify a corresponding management entity 341 that controls a respective group of resources. More specifically, a letter "A" in a group identifier 404 indicates that management entity 341-1 controls the group of resources; a letter "B" in a group identifier 404 indicates that management entity 341-2 controls the respective group of resources; a letter "C" in a group identifier 404 indicates that management entity 341-3 controls the respective group of resources. As discussed, a group identifier 404 or "binding key" associated with a resource can be a text string generated based on the management entity 341 that controls the respective resource.

In one embodiment, additional letters in a group identifier 404 (in respective data fields of the group identifier) can indicate a type of group of resources controlled or potentially controlled by a respective management entity 341. For example, the letter "F" in group identifiers FA1, FB1, and FC1 can indicate that the group of resources includes multiple fabric resources. Note also that group identifiers A1, B1, C1, and D1 can include a prefix such as a letter "S" to identify that the respective groups of resources include switch resources managed by a respective management entity 341 as identified by the respective letters "A", "B", and "C".

As shown in FIG. 7, data set 710 (e.g., resource list) generated by agent 177 includes a column of resource identifiers 402 and corresponding group identifiers 404 (e.g., binding key) indicating to which group each identified resource in the data set 710 belongs. For example, data set 710 indicates that resources R11, R12, and R13 all have a common group identifier 404 (i.e., A1) meaning that they belong to a common group of resources controlled by management entity 341-1. Data set 710 also indicates that resources R21, R22, and R23 all have a common group identifier 404 (i.e., B1) meaning that they belong to a common group of resources controlled by management entity 341-2. Data set 710 also indicates that resources RF1 and RF3 have a common group identifier 404 (i.e., FA1) meaning that they belong to the same group of fabric type of resources and are potentially controlled by management entity 341-1. Data set 710 also indicates that resources RF1, RF2, and RF3 have a common group identifier 404 (i.e., FB1) meaning that they also belong to the same group of fabric type of resources and are potentially controlled by management entity 341-2.

As shown in FIG. 8, data set 810 (e.g., resource list) generated by agent 178 includes a column of resource identifiers 402 and corresponding group identifiers 404 indicating to which group each identified resource in the data set 810 belongs. For example, data set 810 indicates that resources R21, R22, and R23 all have a common group identifier 404 (i.e., B1) meaning that they belong to a common group of resources controlled by management entity 341-2. Data set 810 also indicates that resources R31, R32, and R33 all have a common group identifier 404 (i.e., C1) meaning that they belong to a common group of resources controlled by management entity 341-3. Data set 810 also indicates that resources RF1, RF2, and RF3 have a common group identifier 404 (i.e., FB1) meaning that they belong to the same group of fabric type of resources and are potentially controlled by management entity 341-2. Data set 810 also indicates that resources RF1 and RF2 have a common group identifier 404 (i.e., FC1) meaning that they also belong to the same group of fabric type of resources and are potentially controlled by management entity 341-3.

Referring again to FIG. 4, agents 175, 176, 177, and 178 report groupings of resources to computer system 110 via communications 420. For example, agent 175 reports information in data set 510 to computer system 110 (e.g., resource manager) via communications 420-1; agent 176 reports information in data set 610 to computer system 110 via communications 420-2; agent 177 reports information in data set 710 to computer system 110 via communications 420-3; agent 178 reports information in data set 810 to computer system 110 via communications 420-4.

Based on the learned groupings of resources, computer system 110 and more specifically resource manager 120 assigns the agents management of the resources. Computer system 110 may assign agents to handle execution of commands directed to control resources based on one or more of the following rules:

1. Resources R11, R12, and R13 are preferably all assigned to be managed by a single agent such as agent 175, agent 176, or agent 177. Thus, in lieu of assigning both a first agent and a second agent management responsibilities associated with respective exclusive portions of a particular group of resources such as R11, R12 and R13, the resource manager 120 assigns one agent an exclusive responsibility of managing the group of resources via use of management entity 341-1. Accordingly, the assigned agent that manages the group of resources receives information from management entity 341-1 rather than multiple agents receiving the information regarding the group of resources. This reduces network traffic in the storage area network 100.
2. Resources R21, R22, and R23 are preferably all assigned to be managed by a single agent such as agent 176, agent 177, or agent 178.
3. Resources R31, R32, and R33 all shall be assigned to and managed by agent 178.
4. Assignment of groups of resources to agents preferably results in a minimum number of groups of resources to be assigned to the agents. For example, the computer system 110 preferably assigns a single agent to manage a group of resources rather than splitting assignment of a management of resources to multiple switches. That is, preferably, resources RF1, RF2 and RF3 are assigns to be managed by a common agent such as agent 176 or agent 177.
5. Fabric resources (i.e., RF1, RF2, and RF3) can be managed by an agent not assigned management to any of the switches in the fabric. For example, agent 177 can be assigned to manage group of resources RF1, RF2, and RF3 while agent 176 and agent 178 manage groups of resources including groups of switch resources (R11, R12, and R13), (R21, R22, and R23), and (R31, R32, and R33).
6. Computer system 110 can assign the agents to handle management of groups of resources based on load considerations. For example, assignment of managing resources on behalf of computer system 110 can result in a distribution of duties to the agents so that no one agent is overloaded with a set of management duties.
7. Computer system 110 selectively assigns different agents to execute management responsibilities associated with groups of resources based on an ability of the respective agents to communicate with management entities that control the groups of resources.

Figure 9:
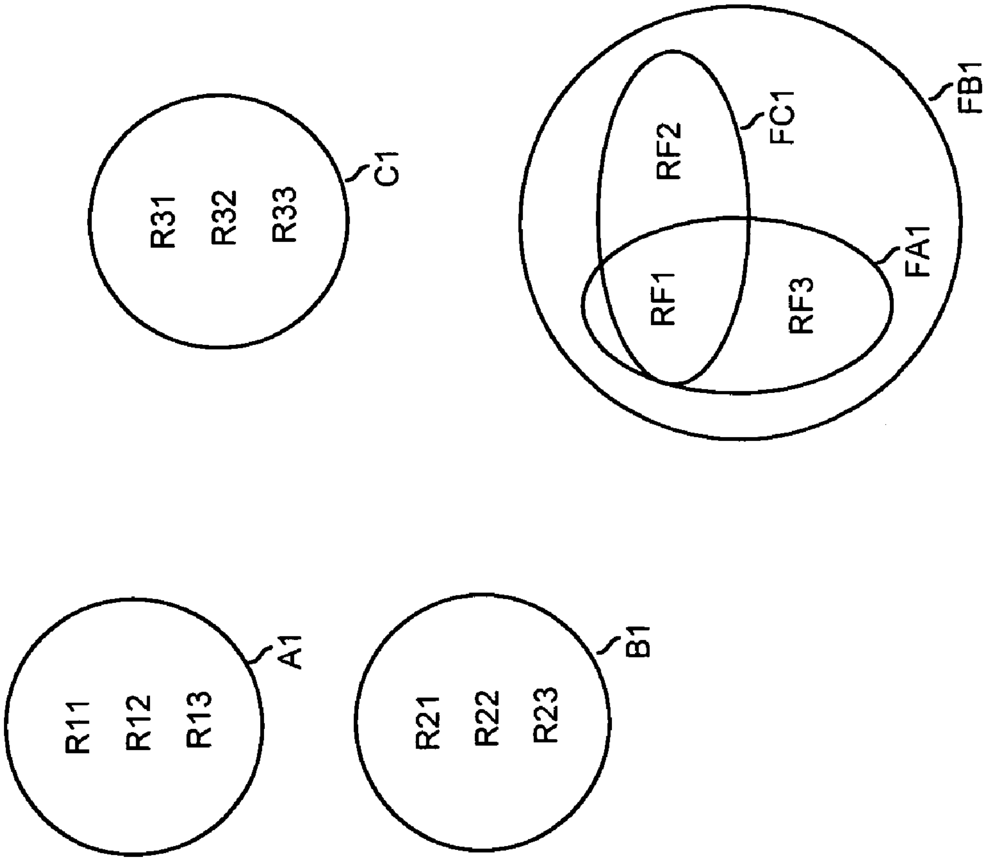
FIG. 9 is a diagram illustrating a grouping of resources associated with multiple management entities in a storage area network.

FIG. 9 is a diagram illustrating a grouping of resources associated with multiple management entities 341 in a storage area network environment 100. As shown in FIG. 9, group A1 includes resources R11, R12, and R13. Group B1 includes resources R21, R22, and R23. Group C1 includes resources R31, R32, and R33. Computer system 110 preferably assigns each of these groups to be managed by a single corresponding agent in storage area network environment 100, although the management responsibilities can be split among multiple agents if necessary.

Group FB1 includes a group of fabric resources (RF1, RF2, and RF3) in storage area network environment 100 potentially controlled by management entity 341-2. Groups FC1 and group FC2 identify groups of fabric resources that are potentially controlled by respective management entity 341-1 and 341-3. If possible, assignment of managing group FB1 to a single agent such as agent 176, 177, or 178 solves a problem of assigning all the member resources of the group. Assigning an agent to manage group FA1 would leave resource RF2 as an orphan. However, this condition can be avoided by assigning another agent to manage group FC1. In such a case, there would be some overlap because two agents could manage resource RF1. To avoid producing sets of orphans, when assigning management of a group of resources, it may be desirable for computer system 110 to assign agents groups of resources encompassing a largest number of resources to reduce how many agents must be assigned to manage the groups of resources.

Figure 10:
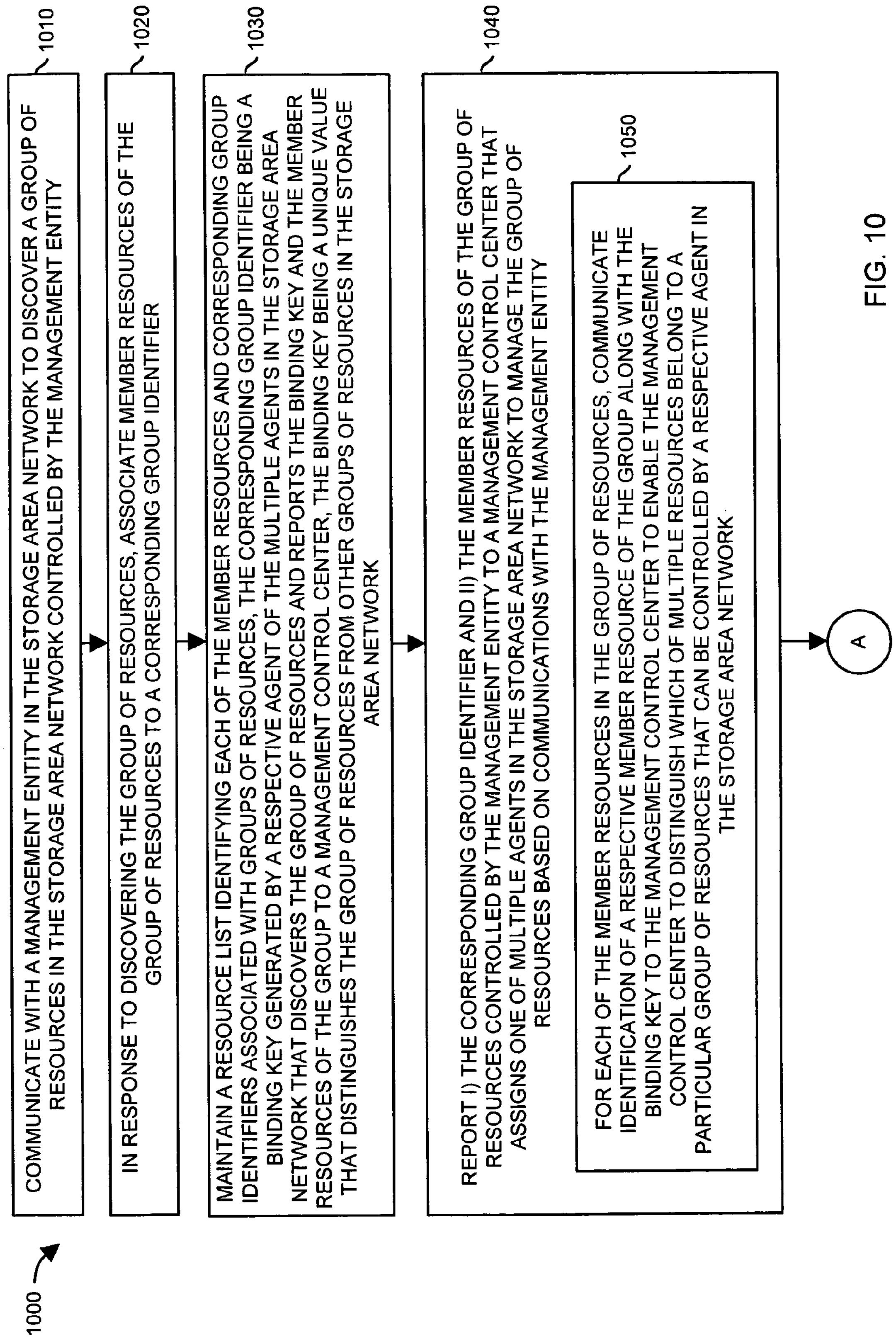
FIGS. 10 and 11 combine to form a flowchart illustrating a technique of reporting group identifiers and respective resources as well as assignment of management responsibilities from the perspective of an agent in a storage area network.

Functionality supported by agents (e.g., agents 175, 176, 177, and 178) in storage area network environment 100 and management control system 400 will now be discussed via flowchart 1000 in FIGS. 10 and 11. For purposes of this discussion, agent 175 performs steps in flowchart 1000. However, any of the agents in storage area network environment 100 support similar processing steps. Note that there will overlap with respect to concepts discussed above for FIGS. 1 through 9. The steps do not necessarily need to be executed in the order shown.

Figure 11:
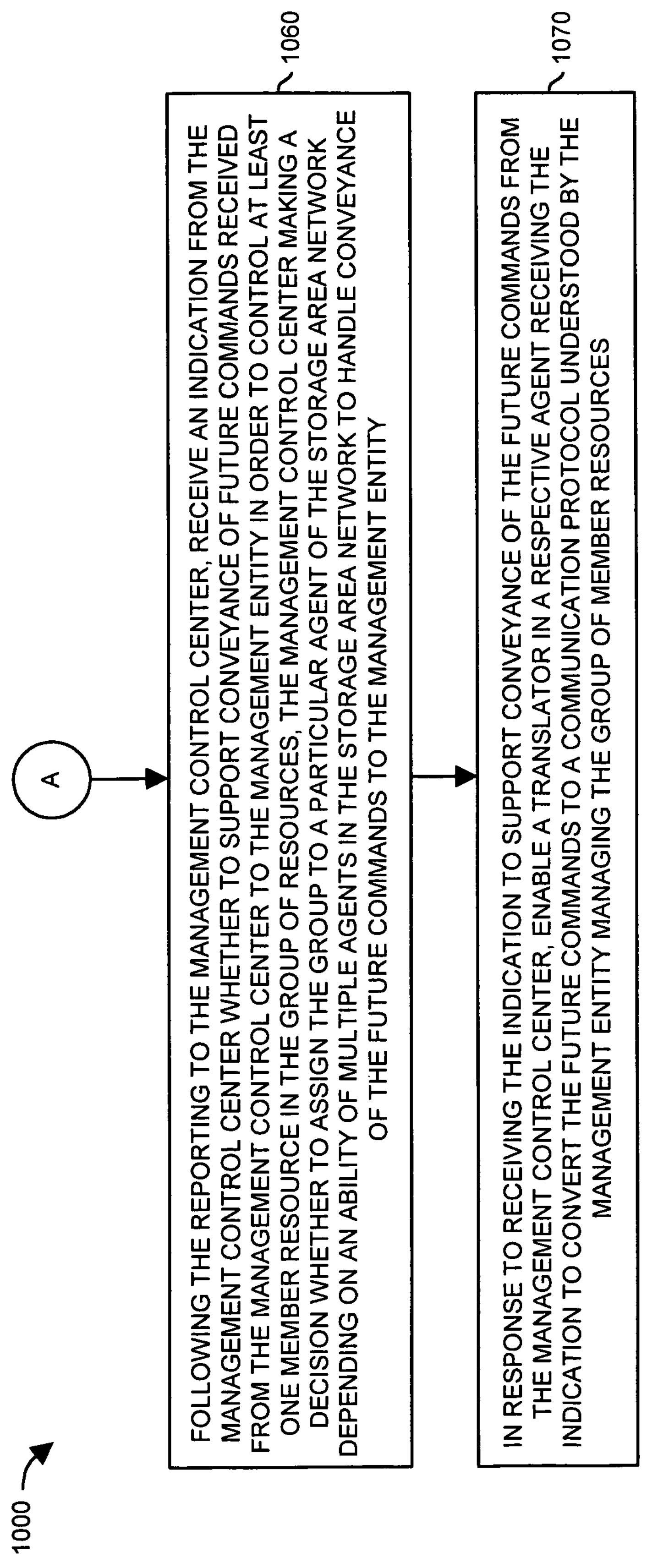

Referring now to FIGS. 101 and 11, in step 1010, agent 176 communicates with a management entity 341 in storage area network environment 100 to discover a group of resources in the storage area network environment 100 controlled by the management entity 341.

In step 1020, in response to discovering the group of resources controlled by the management entity 341, the agent associates member resources of the group of resources to a corresponding group identifier 404. In other words, the resource manager 120 stores a group identifier 404 for each resource identifier 402 as shown in data set 610.

In step 1030, agent 176 maintains a resource list identifying each of the member resources and a corresponding group identifier associated with a group of resources. The corresponding group identifier 404 is a binding key generated by a respective agent of the multiple agents in the storage area network environment 100 that discovers the group of resources and reports the binding key and the member resources of the group of resources to a management control center (e.g., . g., computer system 110). As discussed, the binding key is a unique value that distinguishes the group of resources from other groups of resources in the storage area network environment 100.

In step 1040, agent 176 reports i) a corresponding group identifier 404 and ii) member resources of the group of resources controlled by the management entity 341 and identified by the group identifier 404 to a management control center that assigns one of multiple agents in the storage area network environment 100 to manage the group of resources based on communications with the management entity 341.

In sub-step 1050, for each of the member resources in a group of resources, agent 176 communicates identification of a respective member resource of the group along with the binding key to the management control center to enable the management control center to distinguish which of multiple resources belong to a particular group of resources that can be controlled by a respective agent in the storage area network environment 100.

In step 1060, following the reporting to the management control center, the agent 176 receive an indication from the management control center whether to support conveyance of future commands received from the management control center to the management entity in order to control at least one member resource in the group of resources. The management control center makes a decision whether to assign the group to a particular agent of the storage area network environment 100 depending on an ability of multiple agents in the storage area network environment 100 to handle conveyance of the future commands (e.g., generic commands generated by user 108) to the management entity.

In step 1070, in response to receiving the indication to support conveyance of the future commands from the management control center, the agent 176 enables a translator of agent 176 to convert the generic commands from user 108 to a communication protocol understood by the management entity controlling the group of member resources.

Functionality supported by computer system 110 and, more particularly, resource manager 120 will now be discussed via flowcharts 1200, 1300, and 1400 in respective FIGS. 12, 13 and 14. For purposes of this discussion, resource manager 120 or computer system 110 generally performs steps in the flowcharts. Note that there will be some overlap with respect to concepts discussed above for FIGS. 1 through 11. The steps need not be executed in the order shown.

Figure 12:
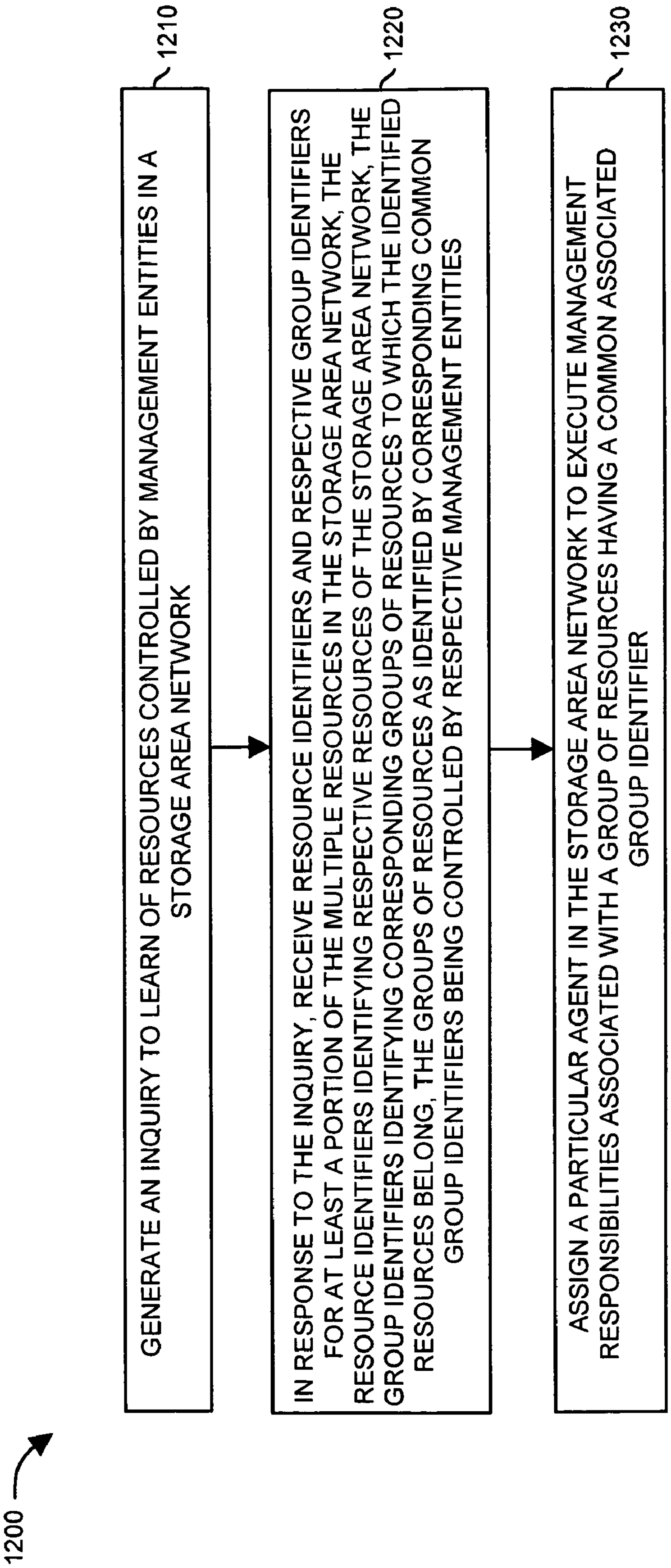
FIG. 12 is a flowchart illustrating a technique of assigning an agent in a storage area network to execute management responsibilities associated with a group of resources having a common associated group identifier.

FIG. 12 is a flowchart 1200 illustrating a technique of assigning an agent in a storage area network environment 100 to execute management responsibilities associated with a group of resources having a common associated group identifier 404.

In step 1210, the resource manager 120 generates an inquiry to learn of resources controlled by respective management entities 341 in storage area network environment 100.

In step 1220, in response to the inquiry, the resource manager 120 receives resource identifiers 402 and respective group identifiers 404 for at least a portion of the multiple resources in the storage area network environment 100. In one application, agents in storage area network provide this information. As discussed, the resource identifiers 402 identify respective resources of the storage area network environment 100. The group identifiers 404 identify corresponding groups of resources to which the identified resources belong. Typically, the groups of resources as identified by corresponding common group identifiers 404 are controlled by a respective management entity 341 in storage area network environment 100.

In step 1230, the resource manager 120 assigns a particular agent in the storage area network environment 100 to execute management responsibilities associated with a group of resources having a common associated group identifier 404.

Figure 13:
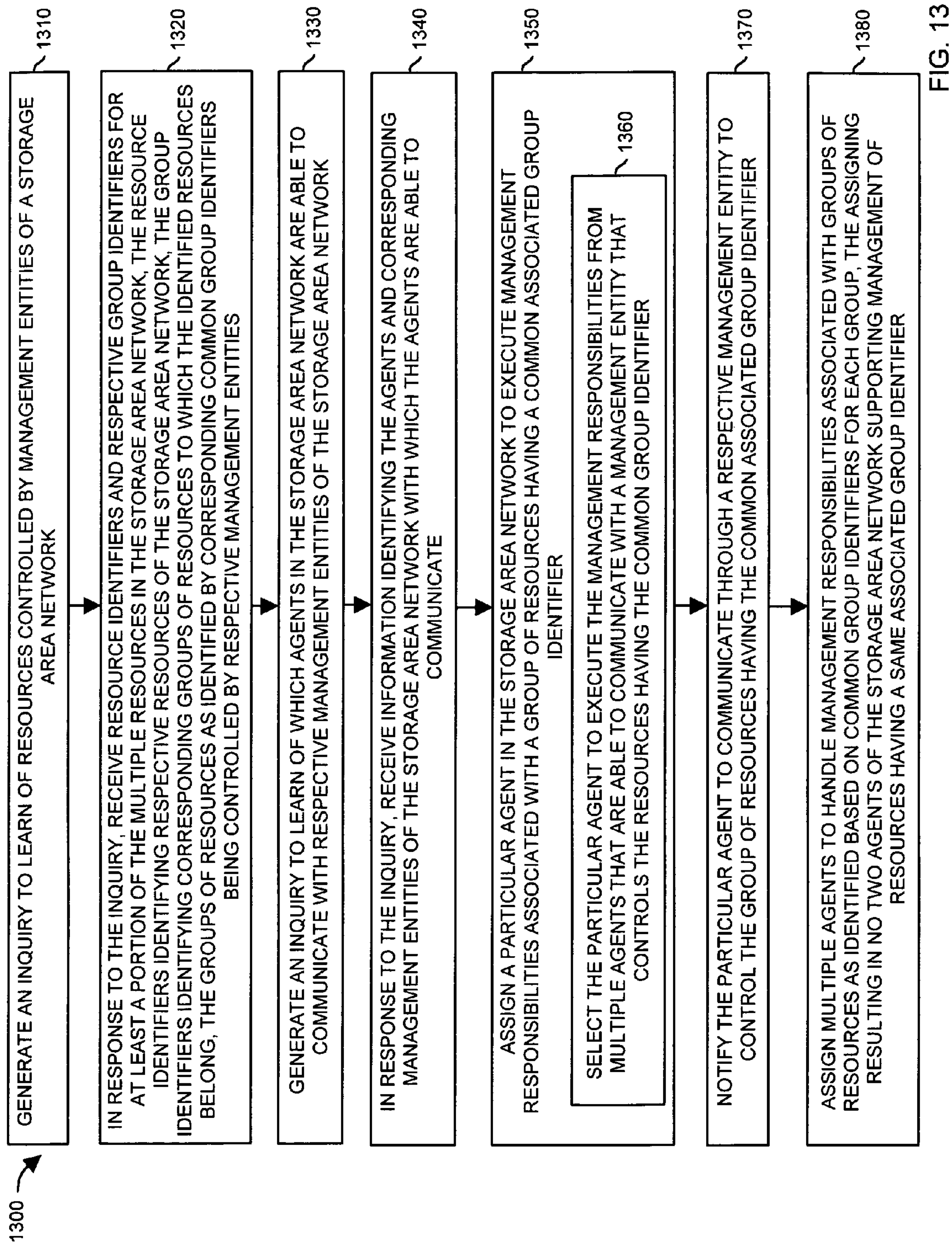
FIG. 13 is a more detailed flowchart illustrating a technique of assigning an agent in a storage area network to execute management responsibilities associated with a group of resources having a common associated group identifier.

FIG. 13 is a more detailed flowchart illustrating a technique of assigning an agent in a storage area network environment 100 to execute management responsibilities associated with a group of resources having a common associated group identifier. The following discussion of FIG. 13 will include some overlap with respect to techniques discussed in FIG. 12.

In step 1310, the resource manager 120 generates an inquiry (potentially to one or multiple agents) to learn of resources controlled by management entities 341 of a storage area network environment 100.

In step 1320, in response to the inquiry, the resource manager 120 receives resource identifiers 402 and respective group identifiers 404 for at least a portion of the multiple resources in the storage area network environment 100. The resource identifiers 402 identify respective resources of the storage area network environment 100. The group identifiers 404 identify corresponding groups of resources to which the identified resources belong. An as discussed, the groups of resources as identified by corresponding common group identifiers are controlled by respective management entities 341.

In step 1330, the resource manager 120 generates an inquiry to learn of which agents in the storage area network environment 100 are able to communicate with respective management entities 341 of the storage area network environment 100.

In step 1340, in response to the inquiry, the resource manager 120 receives information identifying the agents 175, 176, 177, 178 and corresponding management entities 341 of the storage area network environment 100 with which the agents are able to communicate.

In step 1350, the resource manager 120 assigns a particular agent in the storage area network environment 100 to execute management responsibilities associated with a group of identified resources 402 having a common associated group identifier 404.

In step 1360, the resource manager 120 selects the particular agent to execute the management responsibilities from multiple agents that are able to communicate with a management entity 341 that controls the resources having the common group identifier 404.

In step 1370, the resource manager 120 notifies the particular agent to communicate through a respective management entity 341 to control the group of resources having the common associated group identifier 404.

In step 1380, the resource manager 120 assigns multiple agents to handle management responsibilities associated with groups of resources as identified based on common group identifiers for each group. The assignment results in no two agents of the storage area network environment 100 supporting management of resources having a same associated group identifier 404. That is, the resource manager 120 never assigns two agents in storage area network environment 100 duties of managing the same group of resources identified by a particular group identifier 404.

Figure 14:
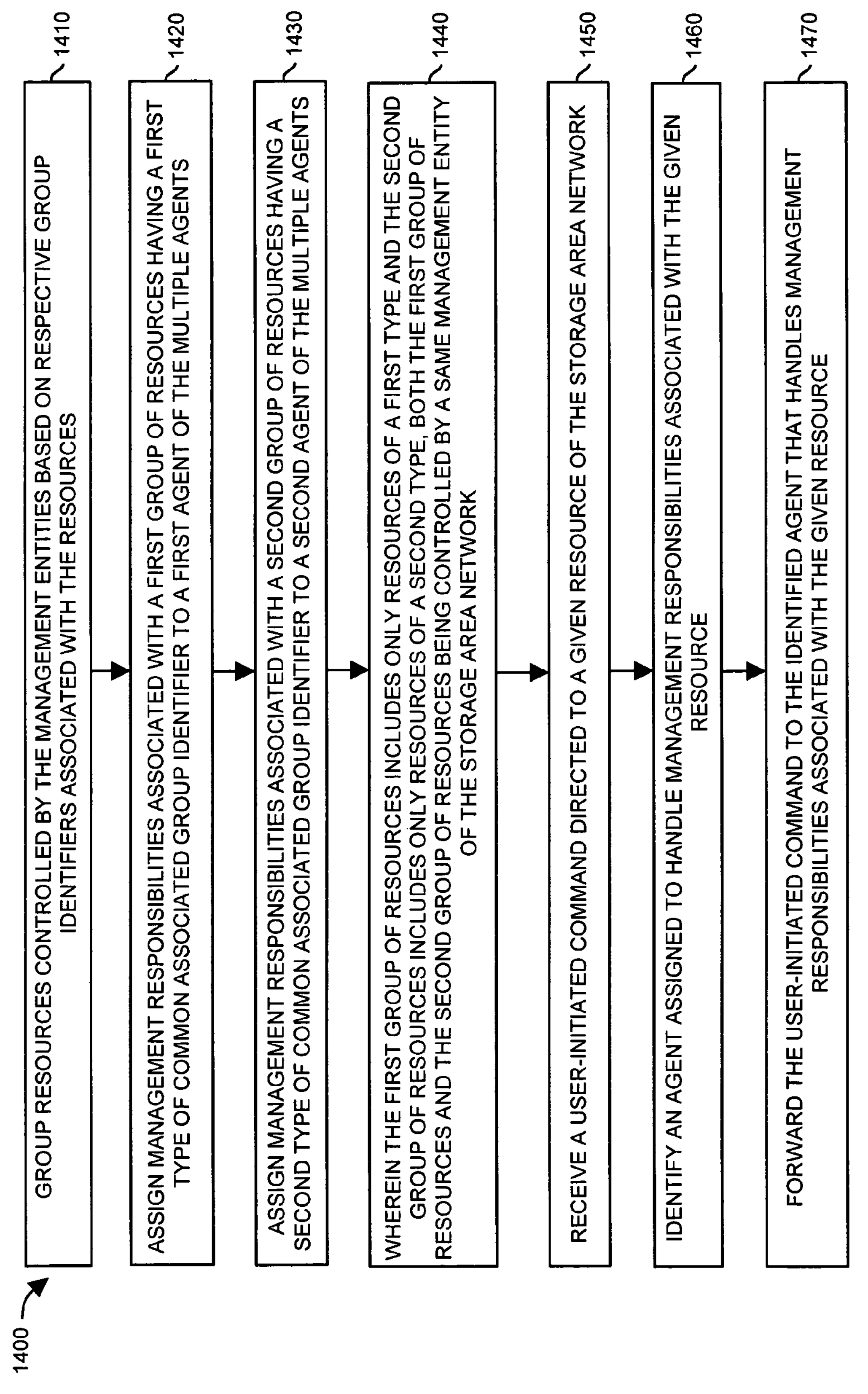
FIG. 14 is a flowchart illustrating a technique of assigning and utilizing an agent in a storage area network to execute management responsibilities associated with a group of resources having a common associated group identifier.

FIG. 14 is a flowchart illustrating a technique of assigning and utilizing an agent in a storage area network environment 100 to execute management responsibilities associated with a group of resources having a common associated group identifier 404.

In step 1410, the resource manager 120 groups resources controlled by the management entities 341 based on respective group identifiers 404 associated with identified resources 402.

In step 1420, the resource manager 120 assigns management responsibilities associated with a first group of resources having a first type of common associated group identifier 404 to a first agent of the multiple agents in storage area network environment 100.

In step 1430, the resource manager 120 assigns management responsibilities associated with a second group of resources having a second type of common associated group identifier 404 to a second agent of the multiple agents in storage area network environment 100.

In step 1440, the resource manager 120 assigns the first group of resources such that the first group of resources includes only resources of a first type and the second group of resources includes only resources of a second type. Both the first group of resources and the second group of resources are controlled by a same management entity of the storage area network environment 100 even though the first agent manages the first group of resources and the second agent manages the second group of resources.

In step 1450, the resource manager 120 receives a user-initiated command directed to a given resource of the storage area network environment 100.

In step 1460, the resource manager 120 identifies an agent assigned to handle management responsibilities associated with the given resource.

In step 1470, the resource manager 120 forwards the user-initiated command to the identified agent that handles management responsibilities associated with the given resource.

As discussed above, techniques of the present application are well suited for use in systems in which a management control center discovers groups of resources managed by management entities in a storage area network and the management control center assigns agents distributed in the storage area network duties of communicating with the management entities that in turn control the groups of resources. However, it should be noted that embodiments of the present application are not limited to such use.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

What is claimed is:

1. In a management control system, a method of assigning management responsibilities associated with resources in a storage area network to multiple agents, the multiple agents being in communication with management entities that in turn control the resources in the storage area network, the method comprising:

generating an inquiry to learn of resources controlled by the management entities of the storage area network;

in response to the inquiry, receiving resource identifiers and respective group identifiers for at least a portion of the multiple resources in the storage area network, the resource identifiers identifying respective resources of the storage area network, the group identifiers identifying corresponding groups of resources to which the identified resources belong, the groups of resources as identified by received common group identifiers being controlled by same respective management entities; and based on processing of the resource identifiers and respective group identifiers, assigning a particular agent in the storage area network to execute management responsibilities associated with a group of resources having a common associated group identifier, the particular agent being one of multiple different agents in communication with a corresponding management entity that controls the group of resources;

wherein receiving the resource identifiers and the group identifiers includes: i) from a first agent of the multiple different agents, receiving a group identifier associated with a given resource group as well as multiple resource identifiers of resources in the given resource group, and ii) from a second agent of the multiple different agents, receiving the group identifier associated with the given resource group as well as the multiple resource identifiers of the resources in the given resource group, the group identifier received from the first agent being a same value as the group identifier received from the second agent, reception of the same value indicating that the given resource group is capable of being managed by the first agent or the second agent;

selecting one of the first agent and the second agent to manage the resource group; and wherein assigning the particular agent includes notifying the selected agent to communicate through a respective management entity to control the resources in the given resource group.

2. A method as in claim 1 further comprising:

generating an inquiry to each of the multiple agents to learn of which agents in the storage area network are able to communicate with respective management entities of the storage area network;

in response to the inquiry, receiving information from the multiple agents, the received information identifying the agents and corresponding management entities of the storage area network with which the agents are able to communicate;

wherein assigning the particular agent further includes selecting the particular agent to execute the management responsibilities from multiple agents that are able to control the resources having the common group identifier.

3. A method as in claim 2 further comprising:

selectively assigning different agents to execute management responsibilities associated with groups of resources based on load-balancing considerations and an ability of the respective agents to control the groups of resources.

4. A method as in claim 1 further comprising:

processing the resource identifiers and respective group identifiers by grouping resources controlled by the management entities based on respective group identifiers associated with the resources; and wherein assigning the particular agent includes:

assigning management responsibilities associated with a first group of resources having a first type of common associated group identifier to the first agent of the multiple agents; and assigning management responsibilities associated with a second group of resources having a second type of common associated group identifier to the second agent of the multiple agents.

5. A method as in claim 4, wherein assigning management responsibilities associated with the first group of resources and assigning management responsibilities associated with the second group of resources results in reduced network traffic based on i) the first agent receiving update information only from a first management entity that controls the first group of resources and ii) the second agent receiving update information only from a second management entity that controls the second group of resources, even though the first agent and the second agent support communications with both the first management entity and the second management entity.

6. A method as in claim 4, wherein the first group of resources includes only resources of a first type and the second group of resources includes only resources of a second type, both the first group of resources and the second group of resources being controlled by a same management entity of the storage area network.

7. A method as in claim 1 further comprising:

assigning multiple agents to handle management responsibilities associated with groups of resources as identified based on a corresponding group identifier for each group, the assigning resulting in no two agents of the storage area network supporting management of resources having a same associated group identifier.

8. A method as in claim 2 further comprising:

identifying resources controlled by management entities of the storage area network in response to a management control center querying the multiple agents about respective resources that the multiple agents can potentially manage.

9. A method as in claim 1 further comprising:

receiving a user-initiated command directed to a given resource of the storage area network;

identifying an agent assigned to handle management responsibilities associated with the given resource; and forwarding the user-initiated command to the identified agent that handles management responsibilities associated with the given resource.

10. A method as in claim 1, wherein receiving resource identifiers and respective group identifiers enables discovery of groupings of resources in the storage area network based on the processing, the method further comprising:

identifying that the first agent and the second agent of the storage area network each can potentially be assigned shared management responsibilities associated with a particular group of resources in the storage area network, the particular group of resources being identified as a grouping based on common group identifiers associated with respective resources in the storage area network, the first agent and the second agent capable of communicating with a management entity that controls the particular group of resources; and assigning the first agent in the storage area network to execute management responsibilities associated with resources having a common associated group identifier.

11. A computer system associated with a storage area network, the computer system assigning management responsibilities associated with resources in a storage area network to multiple agents, the computer system comprising:

a processor;

a memory unit that stores instructions associated with an application executed by the processor; and an interconnected coupling the processor and the memory unit, enabling the computer system to execute the application and perform operations of:

generating an inquiry to learn of resources controlled by management entities of the storage area network;

in response to the inquiry, receiving resource identifiers and respective group identifiers for at least a portion of the multiple resources in the storage area network, the resource identifiers identifying respective resources of the storage area network, the group identifiers identifying corresponding groups of resources to which the identified resources belong, the groups of resources as identified by received common group identifiers being controlled by respective management entities; and based on processing of the resource identifiers and respective group identifiers, assigning a particular agent in the storage area network to execute management responsibilities associated with a group of resources, each resource in the group of resources having a common associated group identifier, the particular agent being one of multiple agents in communication with a corresponding management entity that controls the group of resources;

wherein receiving the resource identifiers and the group identifiers includes: i) from a first agent of the multiple different agents, receiving a group identifier associated with a given resource group as well as multiple resource identifiers of resources in the given resource group, and ii) from a second agent of the multiple different agents, receiving the group identifier associated with the given resource group as well as the multiple resource identifiers of the resources in the given resource group, the group identifier received from the first agent being a same value as the group identifier received from the second agent, reception of the same value indicating that the given resource group is capable of being managed by the first agent or the second agent;

selecting one of the first agent and the second agent to manage the resource group; and wherein assigning the particular agent includes notifying the selected agent to communicate through a respective management entity to control the resources in the given resource group.

12. A computer system as in claim 11 further supporting operations of:

generating an inquiry to learn of which agents in the storage area network are able to communicate with respective management entities of the storage area network;

in response to the inquiry, receiving information identifying the agents and corresponding management entities of the storage area network with which the agents are able to communicate; and wherein assigning the particular agent further includes selecting the particular agent to execute the management responsibilities from multiple agents that are able to communicate with a management entity that controls the resources having the common group identifier.

13. A computer system as in claim 12 further supporting operations of:

selectively assigning different agents to execute management responsibilities associated with groups of resources based on load-balancing considerations and an ability of the respective agents to control the groups of resources.

14. A computer system as in claim 11 further supporting operations of:

grouping resources controlled by the management entities based on respective group identifiers associated with the resources; and wherein assigning the particular agent includes:

assigning management responsibilities associated with a first group of resources having a first type of common associated group identifier to the first agent of the multiple agents; and assigning management responsibilities associated with a second group of resources having a second type of common associated group identifier to the second agent of the multiple agents.

15. A computer system as in claim 14, wherein assigning management responsibilities associated with the first group of resources and assigning management responsibilities associated with the second group of resources results in reduced network traffic based on i) the first agent receiving update information only from a first management entity that controls the first group of resources and ii) the second agent receiving update information only from a second management entity that controls the second group of resources, even though the first agent and the second agent support communications with both the first management entity and the second management entity.

16. A computer system as in claim 11 further supporting operations of:

receiving a user-initiated command directed to a given resource of the storage area network;

identify an agent assigned to handle management responsibilities associated with the given resource; and forwarding the user-initiated command to the identified agent that handles management responsibilities associated with the given resource.

17. A computer system as in claim 11, wherein receiving resource identifiers and respective group identifiers enables discovery of groupings of resources in the storage area network and respective management entities that control the groupings of resources, the computer system further supporting operations of:

identifying that a first agent and a second agent of the storage area network each can potentially be assigned shared management responsibilities associated with a particular group of resources in the storage area network, the particular group of resources being identified as a grouping based on common group identifiers associated with respective resources in the storage area network, the first agent and the second agent capable of communicating with a management entity that controls the particular group of resources; and assigning the first agent in the storage area network to execute management responsibilities associated with resources having a common associated group identifier.

18. A computer system associated with a storage area network, the computer system including:

means for generating an inquiry to learn of resources controlled by management entities of the storage area network;

means for receiving resource identifiers and respective group identifiers for at least a portion of multiple resources in the storage area network in response to the inquiry, the resource identifiers identifying respective resources of the storage area network, the group identifiers identifying corresponding groups of resources to which the identified resources belong, the groups of resources as identified by common group identifier values received from multiple agents, the groups of resources having the common group identifier values being controlled by same respective management entities in the storage area network; and means for assigning a particular agent in the storage area network to execute management responsibilities associated with a group of resources having a common associated group identifier, the particular agent being on of multiple different agents in communicate with a corresponding managed entity that controls the group of resources;

wherein means for receiving the resource identifiers and the group identifiers includes: i) from a first agent of the multiple different agents, means for receiving a group identifier associated with a given resource group as well as multiple resource identifiers of resources in the given resource group, and ii) from a second agent of the multiple different agents, means for receiving the group identifier associated with the given resource group as well as the multiple resource identifiers of the resources in the given resource group, the group identifier received from the first agent being a same value as the group identifier received from the second agent, reception of the same value indicating that the given resource group is capable of being managed by the first agent or the second agent;

means for selecting one of the first agent and the second agent to manage the resource group; and wherein means for assigning the particular agent includes means for notifying the selected agent to communicate through a respective management entity to control the resources in the given resource group.

19. A computer program product including a computer-readable medium having instructions stored thereon for processing data information, such that the instructions, when carried out by a processing device, enable the processing device to perform the steps of:

generating an inquiry to learn of resources controlled by the management entities of the storage area network;

in response to the inquiry, receiving resource identifiers and respective group identifiers for at least a portion of the multiple resources in the storage area network, the resource identifiers identifying respective resources of the storage area network, the group identifiers identifying corresponding groups of resources to which the identified resources belong, the groups of resources as identified by received common group identifiers being controlled by same respective management entities; and based on processing of the resource identifiers and respective group identifiers, assigning a particular agent in the storage area network to execute management responsibilities associated with a group of resources having a common associated group identifier, the particular agent being one of multiple different agents in communication with a corresponding management entity that controls the group of resources;

wherein receiving the resource identifiers and the group identifiers includes: i) from a first agent of the multiple different agents, receiving a group identifier associated with a given resource group as well as multiple resource identifiers of resources in the given resource group, and ii) from a second agent of the multiple different agents, receiving the group identifier associated with the given resource group as well as the multiple resource identifiers of the resources in the given resource group, the group identifier received from the first agent being a same value as the group identifier received from the second agent, reception of the same value indicating that the given resource group is capable of being managed by the first agent or the second agent;

selecting one of the first agent and the second agent to manage the resource group; and wherein assigning the particular agent includes notifying the selected agent to communicate through a respective management entity to control the resources in the given resource group.

* * * * *